United States Patent
Iwan et al.

(10) Patent No.: US 12,052,140 B1
(45) Date of Patent: Jul. 30, 2024

(54) COMPLIANCE FOR CLOUD-BASED APPLICATIONS AND COMPUTER SYSTEMS USING MACHINE LEARNING

(71) Applicant: Capital One Services, LLC, McLean, VA (US)

(72) Inventors: Grant Michael Iwan, Montpelier, VA (US); Mohamed Seck, Aubrey, TX (US); Shannon Reid, Richmond, VA (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/305,095

(22) Filed: Apr. 21, 2023

(51) Int. Cl.
*G06F 15/16* (2006.01)
*H04L 41/08* (2022.01)
*H04L 41/0894* (2022.01)
*H04L 41/16* (2022.01)

(52) U.S. Cl.
CPC ...... *H04L 41/0886* (2013.01); *H04L 41/0894* (2022.05); *H04L 41/16* (2013.01)

(58) Field of Classification Search
CPC ............. H04L 41/0886; H04L 41/0894; H04L 41/16
USPC ......................................................... 709/220
See application file for complete search history.

(56) References Cited

U.S. PATENT DOCUMENTS

| 7,249,347 | B2 * | 7/2007 | Chang | G06Q 40/04 |
| | | | | 717/113 |
| 11,580,475 | B2 * | 2/2023 | Retna | G06N 20/00 |
| 2007/0180490 | A1 * | 8/2007 | Renzi | G06F 21/604 |
| | | | | 726/1 |
| 2012/0209663 | A1 * | 8/2012 | Gaskins, Jr. | G06Q 10/063 |
| | | | | 705/7.36 |
| 2015/0193629 | A1 * | 7/2015 | Hajost | H04L 9/0869 |
| | | | | 713/189 |
| 2018/0189797 | A1 * | 7/2018 | Ravi | G06Q 30/018 |
| 2019/0129407 | A1 | 5/2019 | Cella et al. | |
| 2020/0387357 | A1 | 12/2020 | Mathon et al. | |
| 2022/0365721 | A1 * | 11/2022 | Pabón | G06F 3/067 |

FOREIGN PATENT DOCUMENTS

| CN | 115002215 A | * | 9/2022 | |
| WO | WO-2017127850 A1 | * | 7/2017 | G01C 21/387 |

* cited by examiner

*Primary Examiner* — Ruolei Zong
(74) *Attorney, Agent, or Firm* — Harrity & Harrity, LLP

(57) ABSTRACT

In some implementations, a compliance server may receive a set of data structures associated with one or more compliance activities. The compliance server may apply a machine learning model to the set of data structures in order to generate one or more automation estimates corresponding to the one or more compliance activities. The compliance server may output the one or more automation estimates to a user device. The compliance server may receive, from the user device, an indication of a selected compliance activity from the one or more compliance activities. The compliance server may generate an automation script for the selected compliance activity in response to the indication.

20 Claims, 13 Drawing Sheets

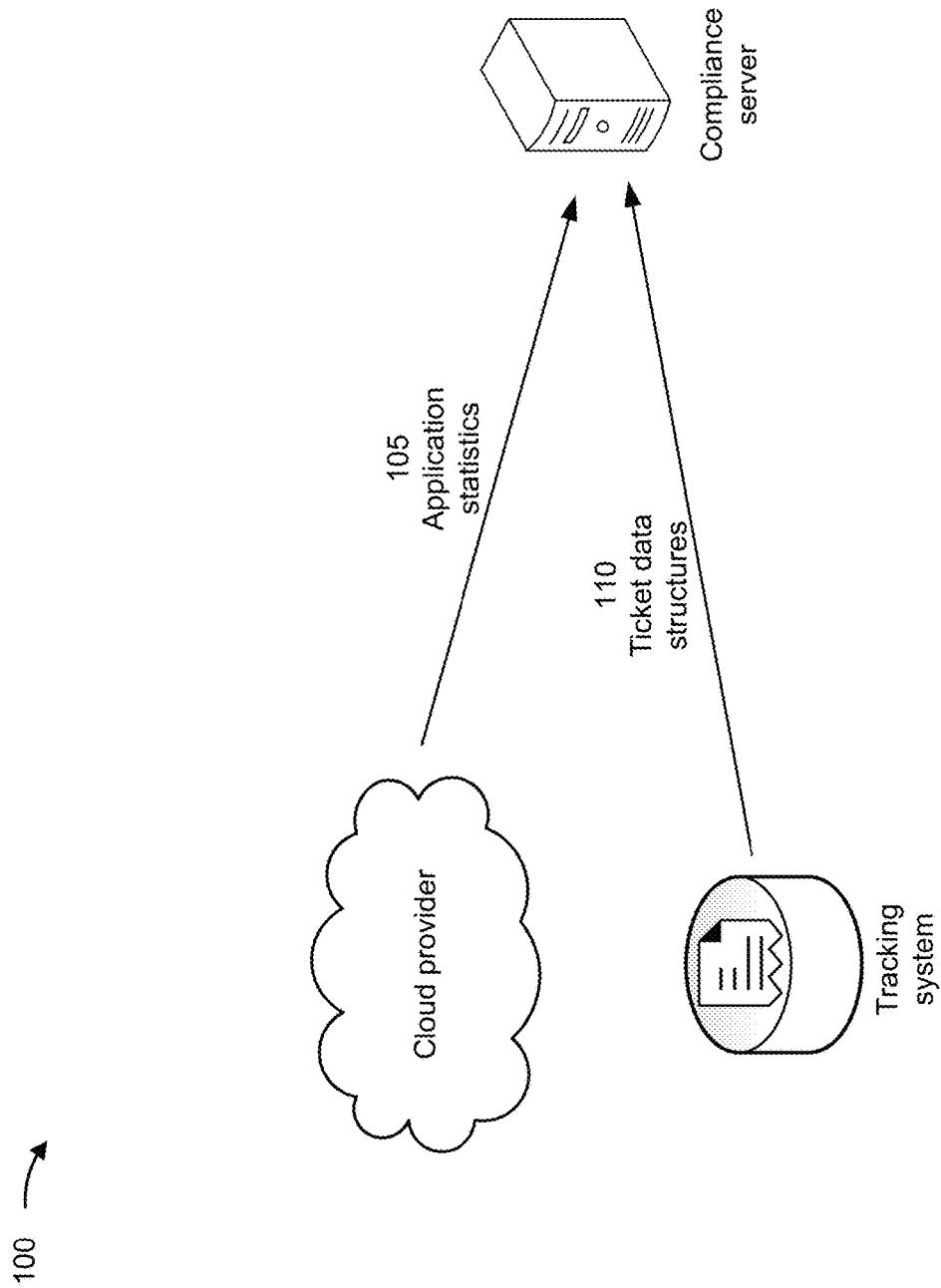

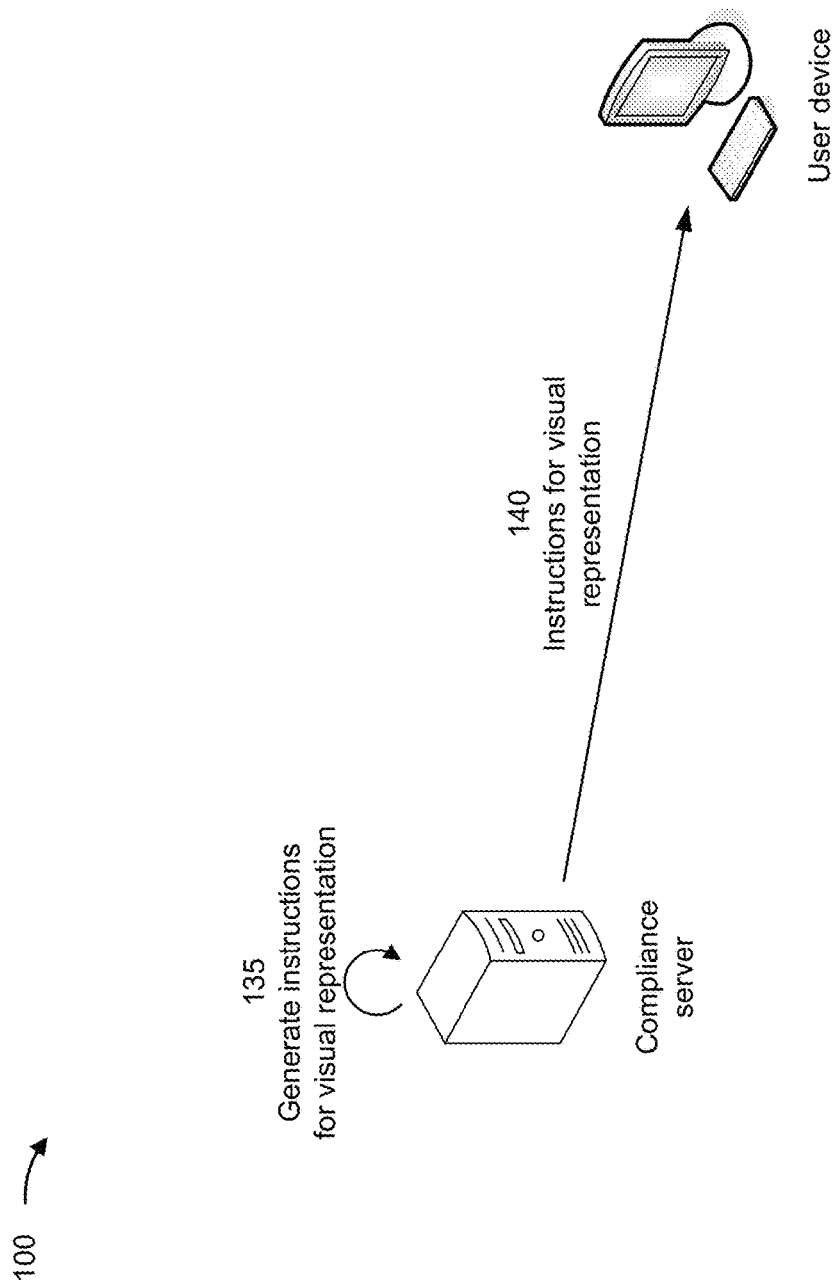

| Rule | Description | Impacted Level | Task Owner | Non-compliance Impact | Story Count | Due Date | LoE | RoA | Office Hours | Support Channel | Instructions Template | Instructions Status |
|---|---|---|---|---|---|---|---|---|---|---|---|---|
| TIR | Review... | TIR Team | TIR Team Certifier | Prime | 12 | 30 days | 1.75 hrs | 1 hr saved | ⊙ | ⋮⋮ | From owner | Updated |
| TIR | Apply... | App component | Engineering Lead | VP escalation | 1 | 15 days | 1 hr | 3 hrs saved | ⊙ | ⋮⋮ | From owner | Updated |
| UTEP | Generate... | ASV | Engineering Lead | Regulators | 3 | Overdue | 5 hrs | 7 hrs saved | ⊙ | ⋮⋮ | From owner | Not updated |
| UTEP | Generate... | ASV | Engineering Lead | Prime | 1 | 15 days | 1 hr | 1 hr saved | ⊙ | ⋮⋮ | From owner | Updating |
| AMI rehydration | Inform... | App component | Engineering Lead | Toc Bridge | 2 | 15 days | 4 hrs | 5 hrs saved | ⊙ | ⋮⋮ | From owner | Updated |
| Non-Par test strategy | Document... | TIR Team | Engineering Lead | VP escalation | 1 | 15 days | 6 hrs | 3 hrs saved | ⊙ | ⋮⋮ | From owner | Updated |
| CI/CD onboarding | Application... | TIR Team | Engineering Lead | Prime | 3 | Overdue | 3 hrs | 1 hr saved | ⊙ | ⋮⋮ | From owner | Updated |
| UTEP | Generate... | ASV | Engineering Lead | Prime | 2 | 15 days | 1 hr | 1 hr saved | ⊙ | ⋮⋮ | From owner | Updated |
| UTEP | Generate... | ASV | Engineering Lead | VP escalation | 3 | 15 days | 7.25 hrs | 3 hrs saved | ⊙ | ⋮⋮ | From owner | Not Updated |
| AMI rehydration | Inform... | App component | Engineering Lead | Toc Bridge | 1 | 15 days | 1 hr | 5 hrs saved | ⊙ | ⋮⋮ | From owner | Updating |
| Non-Par test strategy | Document... | TIR Team | Engineering Lead | Prime | 1 | 15 days | 2.5 hrs | 1 hr saved | ⊙ | ⋮⋮ | From owner | Updating |
| CI/CD onboarding | Application... | TIR Team | Engineering Lead | VP escalation | 3 | 15 days | 1 hr | 3 hrs saved | ⊙ | ⋮⋮ | From owner | Updated |

FIG. 2

| TIR Approval | Card tech | Cloud & productivity engine | Commercial tech | Cyber tech | ML | Enterprise products | Financial services tech | International tech | Retail & direct bank tech | Tech support |
|---|---|---|---|---|---|---|---|---|---|---|
| | 99.4% | 97.7% | 100.0% | 100.0% | 100.0% | 98.4% | 100.0% | 100.0% | 100.0% | 100.0% |

| | Enterprise |
|---|---|
| | 99.5% |

| Escalation Team | Card tech | Cloud & productivity engine | Commercial tech | Cyber tech | ML | Enterprise products | Financial services tech | International tech | Retail & direct bank tech | Tech support |
|---|---|---|---|---|---|---|---|---|---|---|
| | 93.0% | 97.9% | 100.0% | 98.1% | 98.7% | 99.3% | 99.7% | 100.0% | 89.6% | 100.0% |

| | Enterprise |
|---|---|
| | 96.2% |

COMPLIANCE FOR CLOUD-BASED APPLICATIONS AND COMPUTER SYSTEMS USING MACHINE LEARNING

BACKGROUND

Cloud-based applications may be associated with compliance activities. Compliance activities may include software updates and system refreshes, among other examples. Security vulnerabilities may arise when compliance activities are not performed. These vulnerabilities can result in downtime for the cloud-based applications.

SUMMARY

Some implementations described herein relate to a system for deploying automation for compliance for cloud-based applications and computer systems. The system may include one or more memories and one or more processors communicatively coupled to the one or more memories. The one or more processors may be configured to receive, from a cloud provider, a set of statistics associated with one or more compliance activities. The one or more processors may be configured to receive, from a tracking system, a set of data structures representing tickets associated with the one or more compliance activities. The one or more processors may be configured to estimate, based on the set of data structures, one or more levels of effort corresponding to the one or more compliance activities. The one or more processors may be configured to apply a machine learning model to the set of statistics and the one or more levels of effort in order to generate one or more automation estimates corresponding to the one or more compliance activities. The one or more processors may be configured to output instructions for a visual representation of the one or more automation estimates with the one or more compliance activities.

Some implementations described herein relate to a method of deploying automation for compliance for cloud-based applications and computer systems. The method may include receiving a set of data structures associated with one or more compliance activities. The method may include applying a machine learning model to the set of data structures in order to generate one or more automation estimates corresponding to the one or more compliance activities. The method may include outputting the one or more automation estimates to a user device. The method may include receiving, from the user device, an indication of a selected compliance activity from the one or more compliance activities. The method may include generating an automation script for the selected compliance activity in response to the indication.

Some implementations described herein relate to a non-transitory computer-readable medium that stores a set of instructions for deploying automation for compliance for cloud-based applications and computer systems. The set of instructions, when executed by one or more processors of a device, may cause the device to receive, from a cloud provider, a set of statistics associated with one or more compliance activities. The set of instructions, when executed by one or more processors of the device, may cause the device to receive, from a tracking system, a set of data structures representing tickets associated with the one or more compliance activities. The set of instructions, when executed by one or more processors of the device, may cause the device to perform clustering on the set of data structures to estimate one or more levels of effort corresponding to the one or more compliance activities. The set of instructions, when executed by one or more processors of the device, may cause the device to apply a machine learning model to the set of statistics and the one or more levels of effort in order to generate one or more automation estimates corresponding to the one or more compliance activities. The set of instructions, when executed by one or more processors of the device, may cause the device to output the one or more automation estimates in association with the one or more compliance activities.

BRIEF DESCRIPTION OF THE DRAWINGS

FIGS. 1A-1G are diagrams of an example implementation relating to automating compliance for cloud-based applications and computer systems using machine learning, in accordance with some embodiments of the present disclosure.

FIG. 2 is a diagram of an example user interface (UI) associated with automation estimates for compliance activities, in accordance with some embodiments of the present disclosure.

FIGS. 3A and 3B are diagrams of example UIs associated with compliance measurements, in accordance with some embodiments of the present disclosure.

DETAILED DESCRIPTION

Figure 1B:
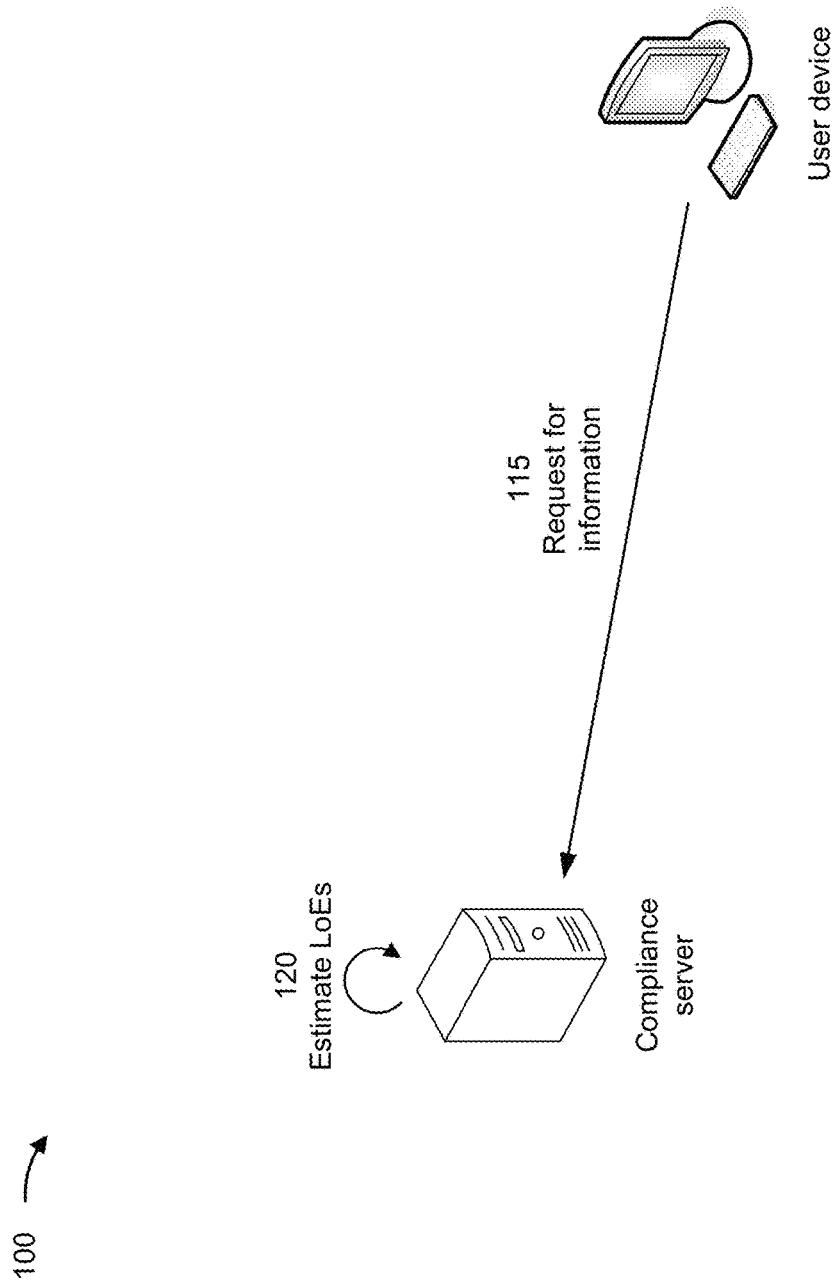

The following detailed description of example implementations refers to the accompanying drawings. The same reference numbers in different drawings may identify the same or similar elements.

In some cloud environments, application services (ASVs) or other cloud-based applications may be associated with compliance activities. Compliance activities may include certification of a set of team members, rehydration of a cloud storage, updating of a software application, review of an application profile review, or registering a dataset, among other examples. Security vulnerabilities may arise when compliance activities are not performed. For example, software applications that are due for security patches or other software updates may be vulnerable to attacks, and drivers or other applications that control networked devices, at least in part, that are due for security patches or other software updates may be vulnerable to attacks. Additionally, technical administrators may verify compliance activities. However, these administrators may be required to follow-up with users who have not completed compliance activities. Some automated techniques may generate these follow-up communications according to one or more rules. However, generating a communication for each compliance activity expends significant amounts of power, processing resources, and network resources, and some users are unlikely to engage with frequent communications.

Furthermore, many compliance activities are simple, such as certifying a team list or rehydrating a cloud storage. Performing these compliance activities automatically reduces latency. Additionally, some compliance activities are related to security vulnerabilities such that automating the compliance activities improves security within a corresponding cloud environment. Some implementations described herein enable automated performance of compliance activities. As a result, the cloud environment is more secure. Additionally, power, processing resources, and network resources are conserved by reducing communications from administrators to users, who would otherwise have had to complete the automated compliance activities.

Automating compliance activities also consumes power and processing resources. Therefore, automating lost-cost compliance activities may be more wasteful than useful. Some implementations described herein enable a machine learning model to estimate amounts of time saved by automating compliance activities. As a result, power and processing resources are conserved by prioritizing compliance activities for automation.

FIGS. 1A-1G are diagrams of an example 100 associated with automating compliance for cloud-based applications and computer systems using machine learning. As shown in FIGS. 1A-1G, example 100 includes a compliance server, a cloud provider, a tracking system, an organization repository, and a user device. These devices are described in more detail in connection with FIGS. 4 and 5.

As shown in FIG. 1A and by reference number 105, the cloud provider may transmit, and the compliance server may receive, a set of statistics associated with compliance activities (e.g., one or more compliance activities). In some implementations, the set of statistics may include binary indicators (e.g., a Boolean indicator of whether a compliance activity was completed for a cloud-based application). Additionally, or alternatively, the set of statistics may include status indicators (e.g., indicating a completion status of an application profile review for a cloud-based application or a registration status for a dataset). Additionally, or alternatively, the set of statistics may include a datetime (e.g., a datetime associated with a most recent certification of a team or a datetime associated with a most recent rehydration for a cloud storage).

In some implementations, the compliance server may transmit, and the cloud provider may receive, a request for the set of statistics. For example, the request may include a hypertext transfer protocol (HTTP) request and/or an application programming interface (API) call, among other examples. The request may include (e.g., in a header and/or as an argument) an indication of a cloud-based application (e.g., one or more indications of one or more cloud-based applications) associated with the compliance activities. Accordingly, the cloud provider may transmit the set of statistics in response to the request. The compliance server may transmit the request according to a schedule (e.g., once per hour or once per day, among other examples) and/or in response to a command to transmit the request. For example, the user device may transmit, and the compliance server may receive, the command, such that the compliance server transmits the request in response to the command.

Additionally, or alternatively, the compliance server may subscribe to statistics updates from the cloud provider. Accordingly, the cloud provider may transmit the set of statistics according to a schedule (e.g., once per hour or once per day, among other examples) and/or as available (e.g., shortly after updated statistics are available).

Additionally, or alternatively, as shown by reference number 110, the tracking system may transmit, and the compliance server may receive, a set of data structures representing tickets associated with the compliance activities. In some implementations, the tickets may be generated in response to non-completion of the compliance activities (e.g., automatically or by an administrator). Alternatively, the tickets may be generated as reminders to complete the compliance activities (e.g., automatically or by the administrator).

In some implementations, the compliance server may transmit, and the tracking system may receive, a request for the set of data structures. For example, the request may include an HTTP request and/or an API call, among other examples. The request may include (e.g., in a header and/or as an argument) an indication of a cloud-based application (e.g., one or more indications of one or more cloud-based applications) associated with the compliance activities. Accordingly, the tracking system may transmit the set of data structures in response to the request. The compliance server may transmit the request according to a schedule (e.g., once per hour or once per day, among other examples) and/or in response to a command to transmit the request. For example, the user device may transmit, and the compliance server may receive, the command, such that the compliance server transmits the request in response to the command.

Additionally, or alternatively, the compliance server may subscribe to ticket updates from the tracking system. Accordingly, the tracking system may transmit the set of data structures according to a schedule (e.g., once per hour or once per day, among other examples) and/or as available (e.g., shortly after new tickets are created).

Although the example 100 is shown with the cloud provider and the tracking system, other examples may include an intermediary system (e.g., one or more intermediary devices) that receive and process information from the cloud provider and/or the tracking system. Accordingly, the compliance server may receive the set of statistics and/or the set of data structures from the intermediary system. Additionally, or alternatively, the intermediary system may calculate statistics (e.g., based on the information received from the cloud provider and/or the tracking system) and/or apply machine learning models to generate derived information (e.g., based on the information received from the cloud provider and/or the tracking system). Accordingly, the compliance server may receive the calculated statistics and/or the derived information from the intermediary system.

As shown in FIG. 1B and by reference number 115, the user device may transmit, and the compliance server may receive, a request for information associated with the compliance activities. For example, the request may include an HTTP request and/or an API call, among other examples. The request may include (e.g., in a header and/or as an argument) an indication of the compliance activities. In one example, a user may interact with a user interface (UI) (e.g., via a keyboard, a mouse, a touchscreen, or another type of input component) and trigger the user device to transmit the request for information based on the interaction. In another example, the user device may transmit the request for information automatically according to a schedule. For example, the user may configure the user device with the schedule such that the user device transmits requests for information to the compliance server periodically.

As shown by reference number 120, the compliance server may estimate levels of effort (LoEs) (e.g., one or more LoEs) corresponding to the compliance activities. The LoEs may be amounts of time (e.g., 1 hour, 2 hours, or 1 day, among other examples) that the compliance activities took (or are predicted to take) to complete manually. In some implementations, the compliance server may apply a model to determine the LoEs. For example, the compliance server may input the set of statistics and/or information extracted from the set of data structures to the model and receive indications of the LoEs from the model.

In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the compliance server may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the model may be a clustering model that groups similar data structures in the set of data structures together. Accordingly, the compliance server may estimate an LoE corresponding to each group of data structures output by the clustering model.

Although the example 100 is shown with the request for information being transmitted after the compliance server receives the set of statistics and the set of data structures and before the compliance server determines the LoEs, other examples may include the request for information triggering the compliance server to request the set of statistics and the set of data structures, as described above. Additionally, or alternatively, other examples may include the compliance server determining the LoEs before receiving the request for information. Alternatively, other examples may include the tracking system (and/or an intermediary system, as described above) determining the LoEs such that the compliance server receives an indication of the LoEs (e.g., similarly to the set of statistics and the set of data structures).

Figure 1C:
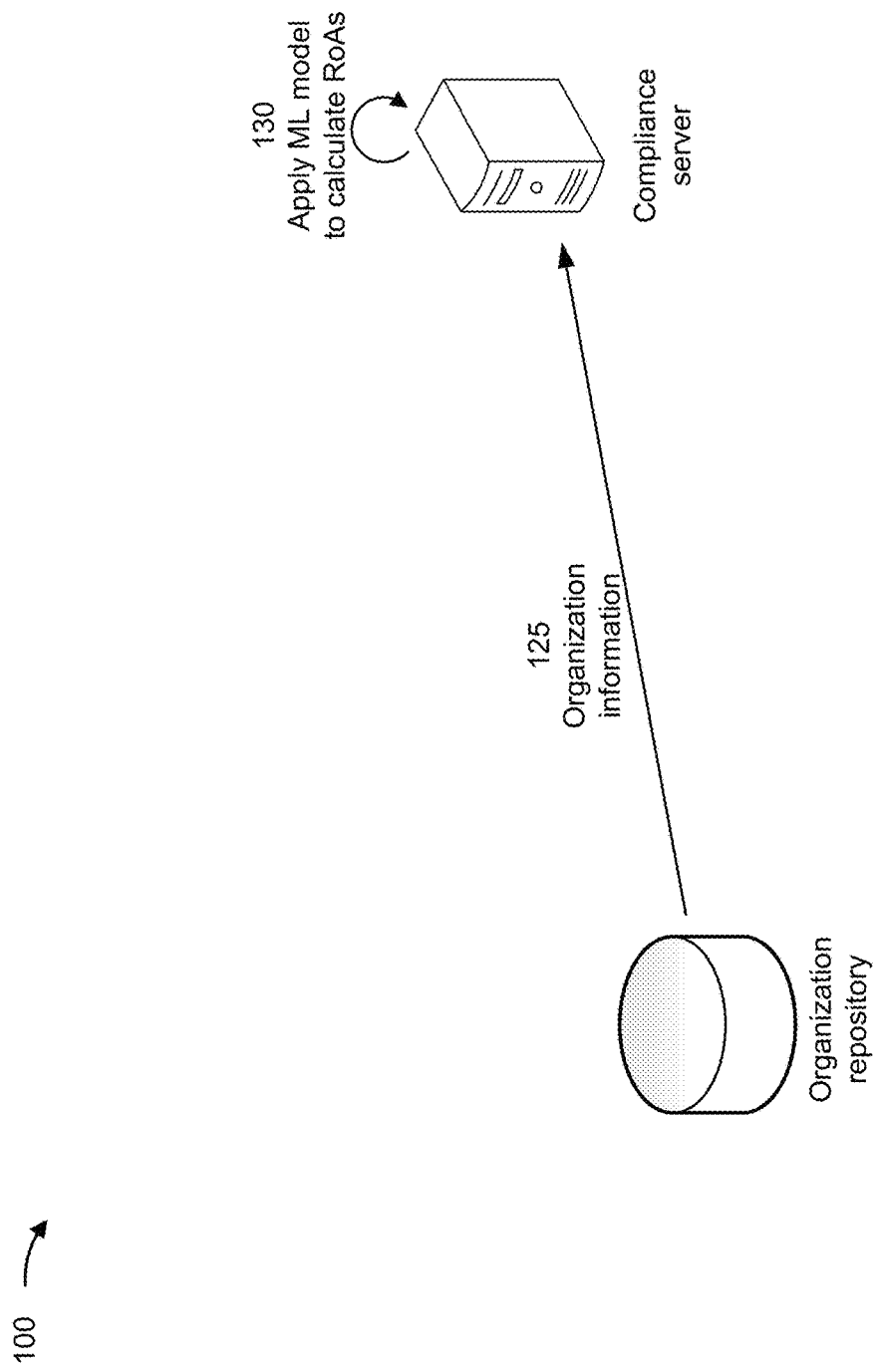

As shown in FIG. 1C and by reference number 125, the organization repository may transmit, and the compliance server may receive, information associated with an organization responsible for the compliance activities. The information may include holidays recognized by the organization, code freezes planned by the organization, and/or release holidays for software managed by the organization, among other examples.

In some implementations, the compliance server may transmit, and the organization repository may receive, a request for the information associated with the organization. For example, the request may include an HTTP request and/or an API call, among other examples. The request may include (e.g., in a header and/or as an argument) an indication of the information requested (e.g., an indication of a holiday schedule, a code freeze schedule, and/or a release holiday schedule, among other examples). Accordingly, the organization repository may transmit the information in response to the request. The compliance server may transmit the request according to a schedule (e.g., once per hour or once per day, among other examples) and/or in response to a command to transmit the request. For example, the user device may transmit, and the compliance server may receive, the command, such that the compliance server transmits the request in response to the command.

Additionally, or alternatively, the compliance server may subscribe to informational updates from the organization repository. Accordingly, the organization repository may transmit the information associated with the organization according to a schedule (e.g., once per hour or once per day, among other examples) and/or as available (e.g., shortly after updates to the holiday schedule, the code freeze schedule, and/or the release holiday schedule, among other examples).

Additionally, or alternatively, in some implementations, the compliance server may determine due dates (e.g., one or more due dates) corresponding to the compliance activities. In some implementations, the set of data structures may indicate the due dates, such that the compliance server extracts the due dates from the set of data structures. Additionally, or alternatively, the compliance server may query a database (e.g., using structured query language (SQL) for a relational database or a different type of query for a NoSQL database) to determine due dates associated with different types of compliance activities. Accordingly, the compliance server may determine the due dates by mapping due dates in the database to categories of the compliance activities (e.g., as indicated in the set of data structures). The database may be local to the compliance server (e.g., stored in a memory managed by the compliance server). Alternatively, the database may be at least partially external (e.g., physically, logically, and/or virtually) from the compliance server. Therefore, the compliance server may transmit the query to the database (e.g., included in an HTTP request and/or using an API call) and receive a response to the query (e.g., included in an HTTP response and/or as a return from the API call).

In some implementations, the compliance server may receive the information associated with the organization and/or determine the due dates in response to the request for information from the user device, as described in connection with reference number 115. Although the example 100 is shown with the information associated with the organization being received, and the due dates being determined, after the compliance server receives the request for information from the user device, other examples may include the compliance server receiving the information associated with the organization and/or determining the due dates, as described above, before receiving the request for information from the user device.

As shown by reference number 130, the compliance server may apply a machine learning model in order to generate automation estimates (e.g., one or more automation estimates) corresponding to the compliance activities. In some implementations, the compliance server may input the set of statistics, the LoEs, the due dates, information extracted from the set of data structures, and/or the information associated with the organization to the machine learning model and receive indications of the automation estimates from the machine learning model. The automation estimates may include returns-on-automation (RoAs) that are amounts of time expected to be saved by automating the corresponding compliance activities. Additionally, or alternatively, the automation estimates may include staffing levels associated with automation (and/or non-automation) of the corresponding compliance activities. For example, the compliance server may calculate a quantity of employees to satisfy the LoEs and/or adjusted LoEs (e.g., after subtracting the RoAs). In some implementations, the compliance server may additionally use the due dates and/or the information associated with the organization to adjust the calculated quantity of employees (e.g., to ensure that overlapping due dates for the compliance activities are met and/or to cover holidays indicated in the information associated with the organization, among other examples).

In some implementations, the machine learning model may include a regression algorithm (e.g., linear regression or logistic regression), which may include a regularized regression algorithm (e.g., Lasso regression, Ridge regression, or Elastic-Net regression). Additionally, or alternatively, the machine learning model may include a decision tree algorithm, which may include a tree ensemble algorithm (e.g., generated using bagging and/or boosting), a random forest algorithm, or a boosted trees algorithm. Additionally, the compliance server may use one or more hyperparameter sets to tune the machine learning model.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm. In some implementations, the compliance server may cluster similar data structures in the set of data structures together, as described above. Accordingly, the compliance server may apply the machine learning model to each cluster to determine an RoA corresponding to a compliance activity associated with a group of data structures in the cluster.

As shown in FIG. 1D and by reference number 135, the compliance server may generate instructions for a visual representation of the automation estimates. In some implementations, as described in connection with FIG. 2, the visual representation may include a tabular representation of the automation estimates in association with the compliance activities. As shown by reference number 140, the compliance server may transmit, and the user device may receive, the instructions for the visual representation. Accordingly, the user device may show or otherwise output a UI based on the instructions for the user of the user device (e.g., via a display, a speaker, or another type of output component). Although the example 100 is described in connection with the visual representation, other examples may include the compliance server outputting the automation estimates to the user device as text or another non-visual data type.

In some implementations, the visual representation may additionally indicate staffing estimates (e.g., calculated as described in connection with reference number 130) in association with the compliance activities. Additionally, or alternatively, the visual representation may indicate outcomes (e.g., one or more outcomes) associated with failure of the compliance activities. The compliance server may determine the outcomes using a database. For example, the compliance server may query the database (e.g., using SQL for a relational database or a different type of query for a NoSQL database) to determine outcomes associated with different types of compliance activities. Accordingly, the compliance server may determine the outcomes by mapping outcomes in the database to categories of the compliance activities (e.g., as indicated in the set of data structures). The database may be local to the compliance server (e.g., stored in a memory managed by the compliance server). Alternatively, the database may be at least partially external (e.g., physically, logically, and/or virtually) from the compliance server. Therefore, the compliance server may transmit the query to the database (e.g., included in an HTTP request and/or using an API call) and receive a response to the query (e.g., included in an HTTP response and/or as a return from the API call). As described in connection with FIG. 2, the outcomes may be indicated using colors.

Additionally, or alternatively, the visual representation may include links (e.g., one or more links), to a communication platform, corresponding to the compliance activities. The compliance server may generate the links using a database. For example, the compliance server may query the database (e.g., using SQL for a relational database or a different type of query for a NoSQL database) to determine links associated with different cloud-based applications. Accordingly, the compliance server may determine the links by mapping links in the database to identifiers of the cloud-based applications associated with the compliance activities (e.g., as indicated by the cloud provider). The database may be local to the compliance server (e.g., stored in a memory managed by the compliance server). Alternatively, the database may be at least partially external (e.g., physically, logically, and/or virtually) from the compliance server. Therefore, the compliance server may transmit the query to the database (e.g., included in an HTTP request and/or using an API call) and receive a response to the query (e.g., included in an HTTP response and/or as a return from the API call). As described in connection with FIG. 2, the outcomes may be indicated using logos.

Figure 1E:
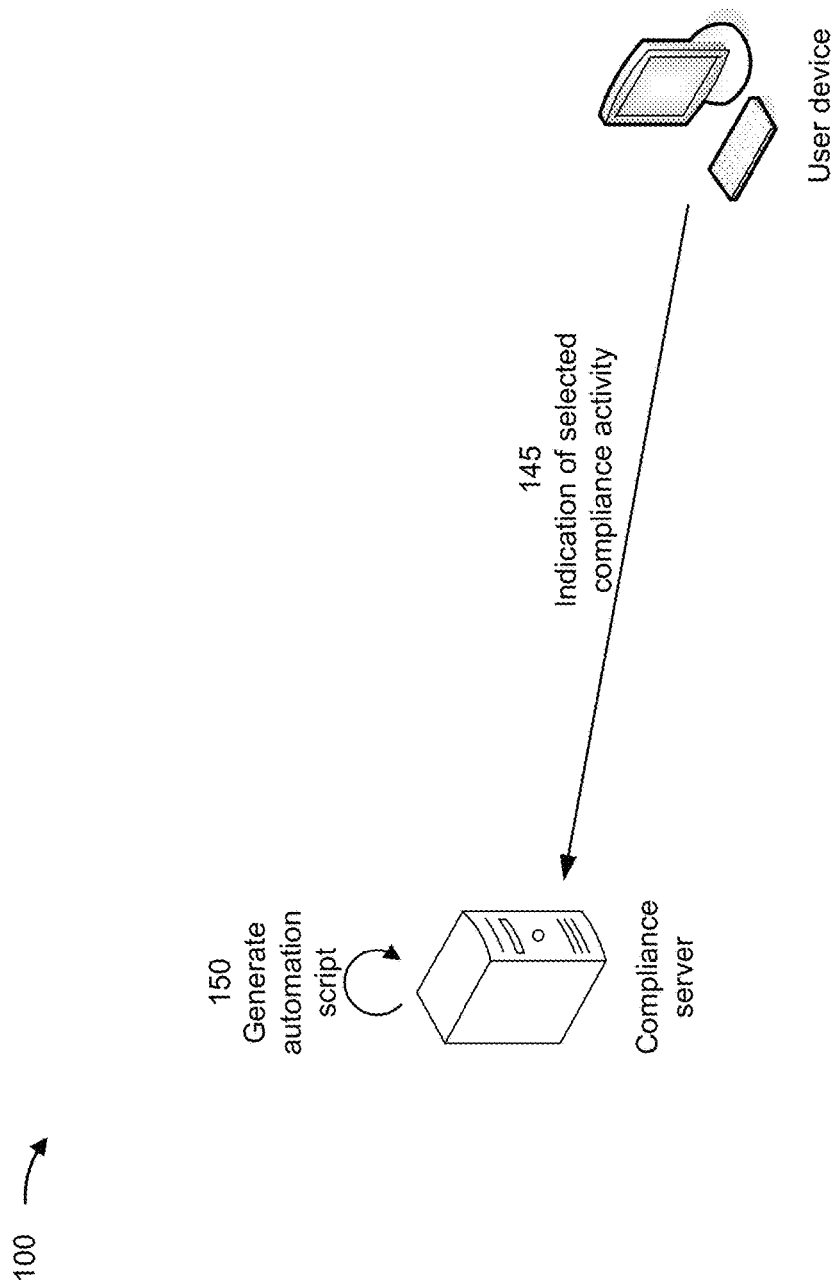

As shown in FIG. 1E and by reference number 145, the user device may transmit, and the compliance server may receive, an indication of a selected compliance activity from the compliance activities. In some implementations, the user may interact with the visual representation (e.g., via a keyboard, a mouse, a touchscreen, or another type of input component) and trigger the user device to transmit the indication of the selected compliance activity in response to the interaction. For example, the user may perform a left click, a tap, push an enter key, speak an audio command, or otherwise indicate the selected compliance activity to the user device.

As shown by reference number 150, the compliance server may generate an automation script for the selected compliance activity. For example, the compliance server may generate the script in response to the indication of the selected compliance activity from the user device. The automation script may instruct the cloud provider to perform an action for a cloud-based application associated with the selected compliance activity. For example, the automated remediation script may trigger a patch and/or other software update to the cloud-based application, trigger a refresh (also referred to as a "reboot" or a "rehydration") for the cloud-based application, or finalize registration of a dataset used by the cloud-based application, among other examples. The automation script may include a sequence of instructions corresponding to a plurality of commands for performing the action. For example, the compliance server may generate Bourne Again Shell (BASH) instructions, Python instructions, and/or other scriptable instructions that will trigger the plurality of commands to be executed by the cloud provider.

The compliance server may generate the automation script based on corresponding data structures, in the set of data structures, representing tickets associated with the selected compliance activity. For example, the compliance server may identify, within the corresponding data structures, a sequence of steps that were performed. Accordingly, the compliance server may identify a plurality of commands, to be provided to the cloud provider, based on the sequence of steps. In some implementations, the plurality of commands may include commands that were manually entered when the compliance activity was performed. Additionally, or alternatively, the plurality of commands may be associated with other data structures (e.g., in the set of data structure) that are determined to be similar to the corresponding data structures (e.g., by a clustering model or another type of machine learning model, as described herein).

By providing the visual representation of the automation estimates, the compliance server guides selection of a compliance activity, for automation, from the compliance activities. As a result, the compliance server conserves power and processing resources that would otherwise have been wasted on automating a compliance activity, out of the compliance activities, associated with a smaller estimate out of the automation estimates.

Figure 1F:
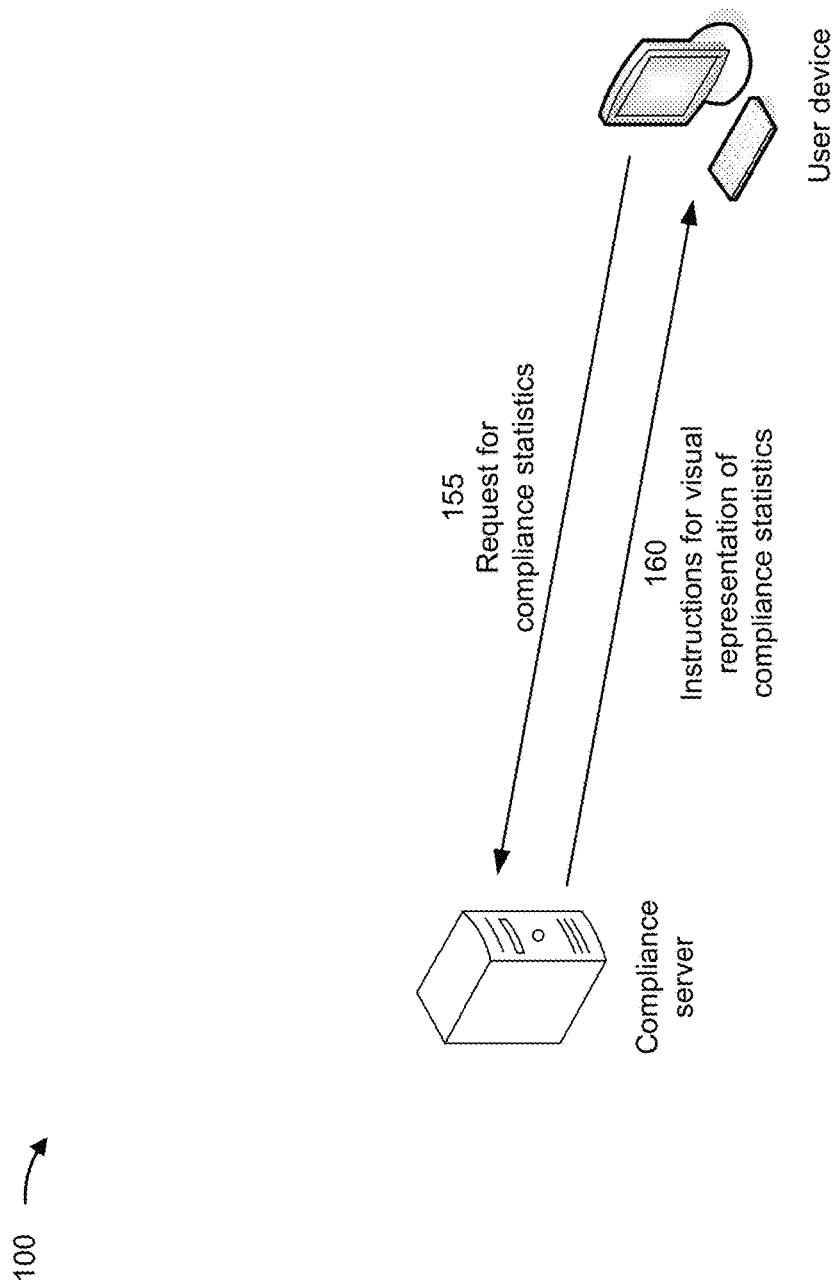

In some implementations, as shown in FIG. 1F and by reference number 155, the user device may transmit, and the compliance server may receive, a request for compliance statistics associated with the compliance activities. The compliance statistics may include a set of compliance measurements, such as a compliance percentage (e.g., at least one compliance percentage) associated with a cloud-based application (e.g., at least one cloud-based application) related to the compliance activities. The user of the user device may interact with a UI (e.g., via a keyboard, a mouse, a touchscreen, or another type of input component) and trigger the user device to transmit the request for compliance statistics based on the interaction.

Accordingly, the compliance server may determine the compliance statistics. For example, the compliance server may calculate a portion of the compliance activities that are complete as compared with a remaining portion of the compliance activities that are incomplete, as described in connection with FIG. 3A. The compliance statistics may be calculated for each category associated with the compliance activities (e.g., each type of compliance activity) and/or for each cloud-based application related to the compliance activities.

The compliance server may generate instructions for a visual representation of the compliance statistics. In some implementations, as described in connection with FIG. 3A, the visual representation may include a tabular representation of the compliance statistics in association with the compliance activities. As shown by reference number 160, the compliance server may transmit, and the user device may receive, the instructions for the visual representation. Accordingly, the user device may show or otherwise output a UI based on the instructions for the user of the user device (e.g., via a display, a speaker, or another type of output component). Although the example 100 is described in connection with the visual representation, other examples may include the compliance server outputting the compliance statistics to the user device as text or another non-visual data type.

Figure 1G:
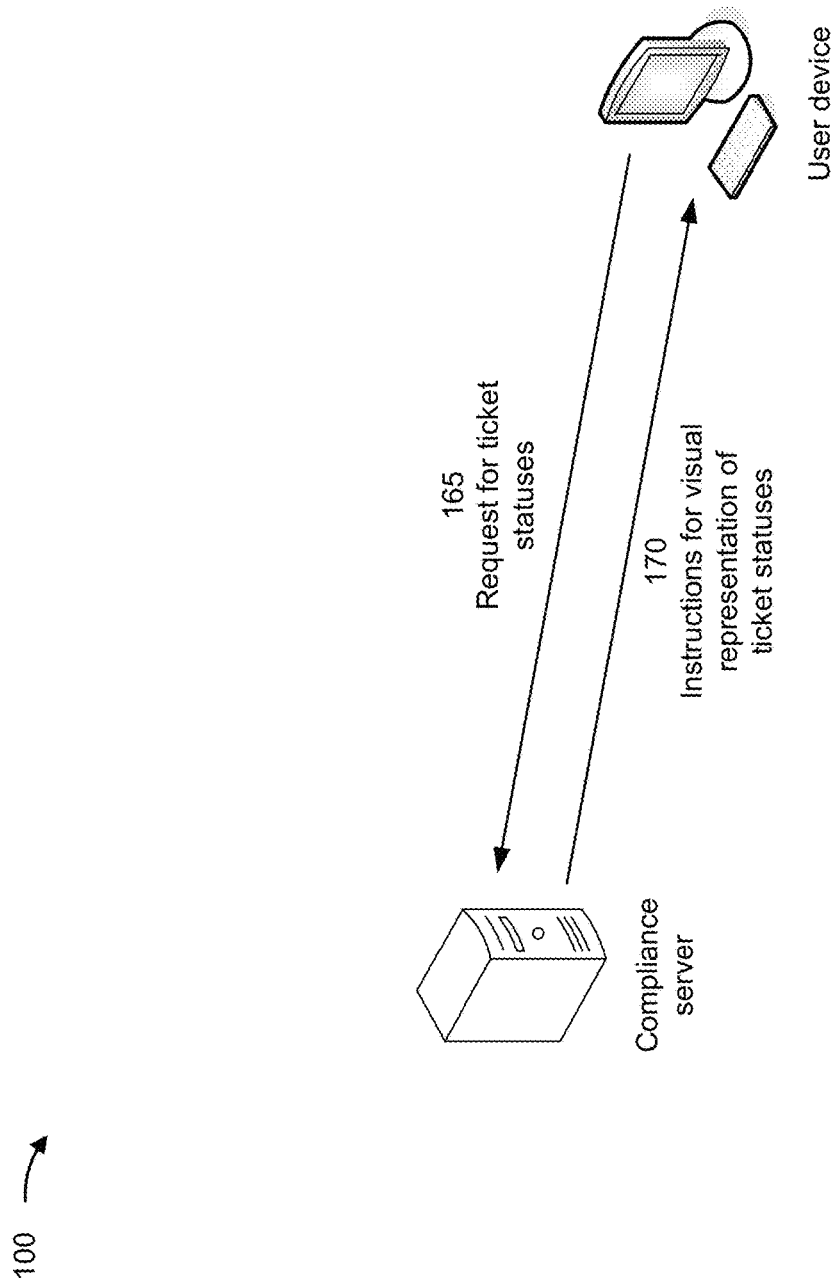

Additionally, or alternatively, as shown in FIG. 1G and by reference number 165, the user device may transmit, and the compliance server may receive, a request for ticket statuses associated with the compliance activities. The ticket statuses may include a set of compliance ratios, such as a percentage (e.g., at least one compliance percentage) associated with ticket completion (and thus compliance activity completion). The user of the user device may interact with a UI (e.g., via a keyboard, a mouse, a touchscreen, or another type of input component) and trigger the user device to transmit the request for ticket statuses based on the interaction.

Accordingly, the compliance server may determine the ticket statuses. For example, the compliance server may calculate a portion of the tickets (represented by the set of data structures) that are complete as compared with a remaining portion of the tickets that are incomplete, as described in connection with FIG. 3B. The ticket statuses may be calculated for each category associated with the compliance activities (e.g., each priority level associated with the compliance activities) and/or for each cloud-based application related to the compliance activities.

The compliance server may generate instructions for a visual representation of the ticket statuses. In some implementations, as described in connection with FIG. 3B, the visual representation may include a graph (e.g., one or more graphs) of the ticket statuses in association with the compliance activities. As shown by reference number 170, the compliance server may transmit, and the user device may receive, the instructions for the visual representation. Accordingly, the user device may show or otherwise output a UI based on the instructions for the user of the user device (e.g., via a display, a speaker, or another type of output component). Although the example 100 is described in connection with the visual representation, other examples may include the compliance server outputting the ticket statuses to the user device as text or another non-visual data type.

By using techniques as described in connection with FIGS. 1A-1G, the compliance server generates automation estimates in order to prioritize automation of compliance activities. As a result, power and processing resources are conserved that would otherwise have been wasted on automating lost-cost compliance activities. Moreover, for compliance activities that are automated, power, processing resources, and network resources are conserved by reducing communications from administrators to users who would otherwise have had to complete the automated compliance activities.

As indicated above, FIGS. 1A-1G are provided as an example. Other examples may differ from what is described with regard to FIGS. 1A-1G.

FIG. 2 is a diagram of an example UI 200 associated with automation estimates for compliance activities. The example UI 200 may be shown by a user device (e.g., based on instructions from a compliance server). These devices are described in more detail in connection with FIGS. 4 and 5.

As shown by reference number 202, the example UI 200 may indicate different categories of compliance activity. For example, the categories in FIG. 2 are types of compliance activities, such as types of technology information risk (TIR) compliance activities, types of unified technology exceptions program (UTEP) compliance activities, Amazon® machine images (AMI) compliance activities, non-parametric (non-par) test compliance activities, and continuous integration and continuous delivery (CI/CD) compliance activities, among other examples.

In some implementations, the example UI 200 may include descriptions corresponding to the types of compliance activities, as shown by reference number 204, and may indicate owners of the types of compliance activities, as shown by reference number 206. The example UI 200 may further indicate outcomes associated with failure of the compliance activities, as shown by reference number 208. The outcomes may be determined as described in connection with reference number 135 of FIG. 1D. The outcomes may be additionally or alternatively indicated using colors. For example, cells in the example UI 200 may be colored to distinguish different outcomes indicated therein.

In some implementations, the example UI 200 may indicate quantities of tickets associated with the compliance activities, as shown by reference number 210. For example, the compliance server may determine the quantities based on a set of data structures, representing the tickets, from a tracking system, as described in connection with FIG. 1A.

The example UI 200 may further indicate due dates and LoEs associated with the compliance activities, as shown by reference numbers 212 and 214, respectively. The LoEs may be estimated as described in connection with reference number 120 of FIG. 1B, and the due dates may be determined as described in connection with reference number 125 of FIG. 1C. The LoEs may be additionally or alternatively indicated using colors. For example, cells in the example UI 200 may be colored to distinguish different LoEs indicated therein.

The example UI 200 may further indicate automation estimates (e.g., RoAs) associated with the compliance activities, as shown by reference number 216. The automation estimates may be calculated as described in connection with reference number 130 of FIG. 1C. The automation estimates may be additionally or alternatively indicated using colors. For example, cells in the example UI 200 may be colored to distinguish different automation estimates indicated therein.

In some implementations, the example UI 200 may indicate links to a communication platform associated with the compliance activities, as shown by reference number 218. In FIG. 2, the links in "Office Hours" may link to video conference rooms for support in performing the compliance activities. The links in "Support Channel" may link to chat rooms for support in performing the compliance activities. The compliance server may generate the links as described in connection with reference number 140 of FIG. 1D. The communication platform may include Zoom® or Slack®, among other examples. As shown in FIG. 2, the links may be shown as interactive logos.

Figure 3B:
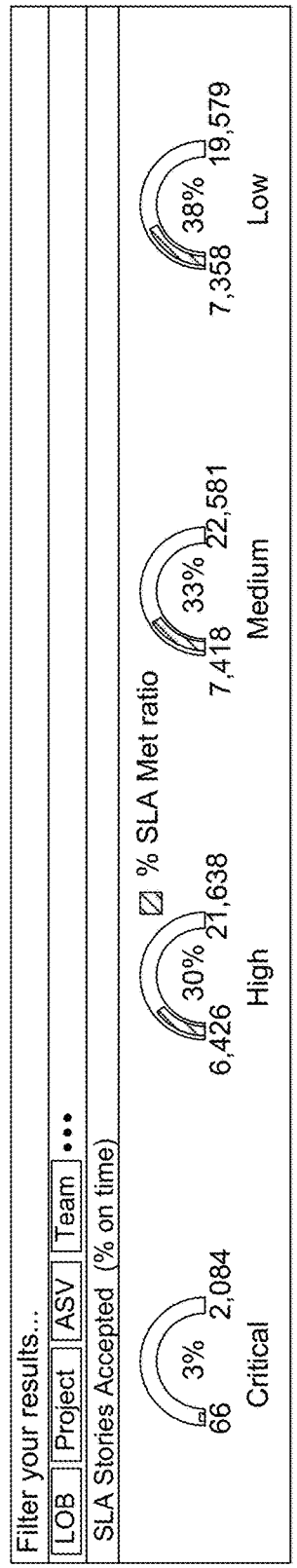

FIGS. 3A and 3B are diagrams of example UIs 300 and 350, respectively, associated with compliance measurements. The example UIs 300 and 350 may be shown by a user device (e.g., based on instructions from a compliance server). These devices are described in more detail in connection with FIGS. 4 and 5.

As shown in FIG. 3A, the example UI 300 may indicates a percentage of completed compliance activities per type of compliance activities, such as TIR approval activities and escalation activities, as shown in FIG. 3A, among other examples. The overall percentages are shown under "Enterprise" in the example UI 300. Additionally, for each type of compliance activity (e.g., TIR approval activities and escalation activities, among other examples), the example UI 300 indicates a percentage of completed compliance activities per category of compliance activities, such as card technology activities, cloud engine activities, commercial technology activities, cyber technology activities, machine learning (ML) activities, enterprise activities, financial services activities, international technology activities, bank technology activities, and tech support activities, as shown in FIG. 3A, among other examples.

As shown in FIG. 3B, the example UI 350 may indicates a ratio of completed tickets per category of compliance activities. For example, the categories in FIG. 3B are priorities of compliance activities, such as critical, high, medium, and low, among other examples. In some implementations, as shown in FIG. 3B, the ratios may be shown using graphs along with corresponding text (showing both percentages and raw numbers of the ratios). Additionally, or alternatively, the ratios may be indicated using colors. For example, portions of the graphs in the example UI 350 may be colored to indicate the ratios.

As indicated above, FIGS. 2, 3A, and 3B are provided as examples. Other examples may differ from what is described with regard to FIGS. 2, 3A, and 3B.

Figure 4:
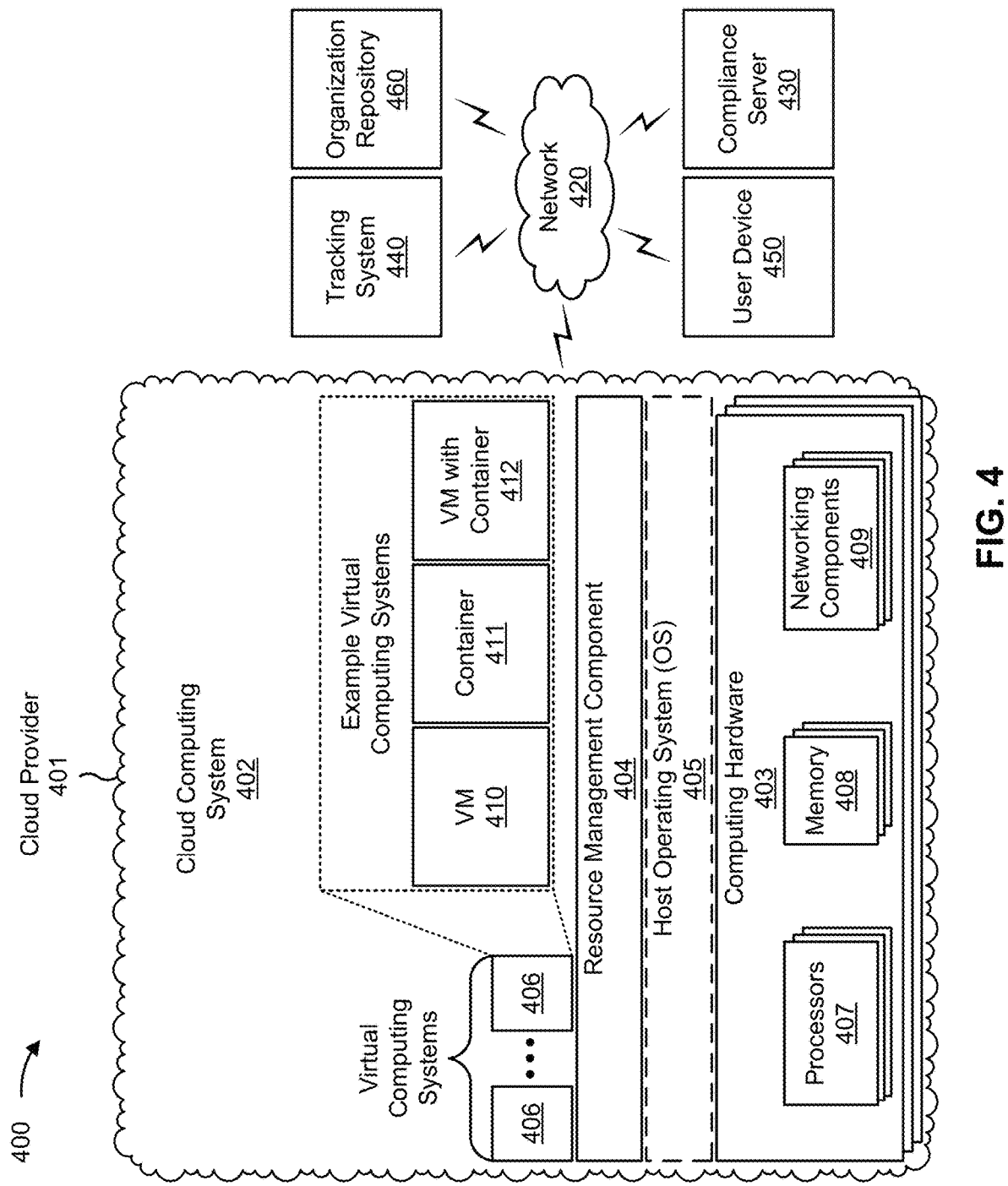
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a cloud provider 401, which may include one or more elements of and/or may execute within a cloud computing system 402. The cloud computing system 402 may include one or more elements 403-412, as described in more detail below. As further shown in FIG. 4, environment 400 may include a network 420, a compliance server 430, a tracking system 440, a user device 450, and/or an organization repository 460. Devices and/or elements of environment 400 may interconnect via wired connections and/or wireless connections.

The cloud computing system 402 may include computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

The computing hardware 403 may include hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 may include a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 may include a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the cloud provider 401 may include one or more elements 403-412 of the cloud computing system 402, may execute within the cloud computing system 402, and/or may be hosted within the cloud computing system 402, in some implementations, the cloud provider 401 may not be cloud-based (e.g., may be implemented outside of a cloud computing system) or may be partially cloud-based. For example, the cloud provider 401 may include one or more devices that are not part of the cloud computing system 402, such as device 500 of FIG. 5, which may include a stand-alone server or another type of computing device. The cloud provider 401 may perform one or more operations and/or processes described in more detail elsewhere herein.

The network 420 may include one or more wired and/or wireless networks. For example, the network 420 may include a cellular network, a public land mobile network (PLMN), a local area network (LAN), a wide area network (WAN), a private network, the Internet, and/or a combination of these or other types of networks. The network 420 enables communication among the devices of the environment 400.

The compliance server 430 may include one or more devices capable of receiving, generating, storing, processing, providing, and/or routing information associated with compliance activities, as described elsewhere herein. The compliance server 430 may include a communication device and/or a computing device. For example, the compliance server 430 may include a server, such as an application server, a client server, a web server, a database server, a host server, a proxy server, a virtual server (e.g., executing on computing hardware), or a server in a cloud computing system. In some implementations, the compliance server 430 may include computing hardware used in a cloud computing environment. The compliance server 430 may communicate with one or more other devices of environment 400, as described elsewhere herein.

The tracking system 440 may include one or more devices capable of receiving, generating, storing, processing, and/or providing information associated with tickets associated with compliance activities, as described elsewhere herein. The tracking system 440 may include a communication device and/or a computing device. For example, the tracking system 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The tracking system 440 may include an issue tracking system, such as Jira® or Bugzilla®, among other examples. The tracking system 440 may communicate with one or more other devices of environment 400, as described elsewhere herein.

The user device 450 may include one or more devices capable of receiving, generating, storing, processing, and/or providing information associated with compliance activities, as described elsewhere herein. The user device 450 may include a communication device and/or a computing device. For example, the user device 450 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 450 may communicate with one or more other devices of environment 400, as described elsewhere herein.

The organization repository 460 may include one or more devices capable of receiving, generating, storing, processing, and/or providing information associated with an organization, as described elsewhere herein. The organization repository 460 may include a communication device and/or a computing device. For example, the organization repository 460 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The organization repository 460 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
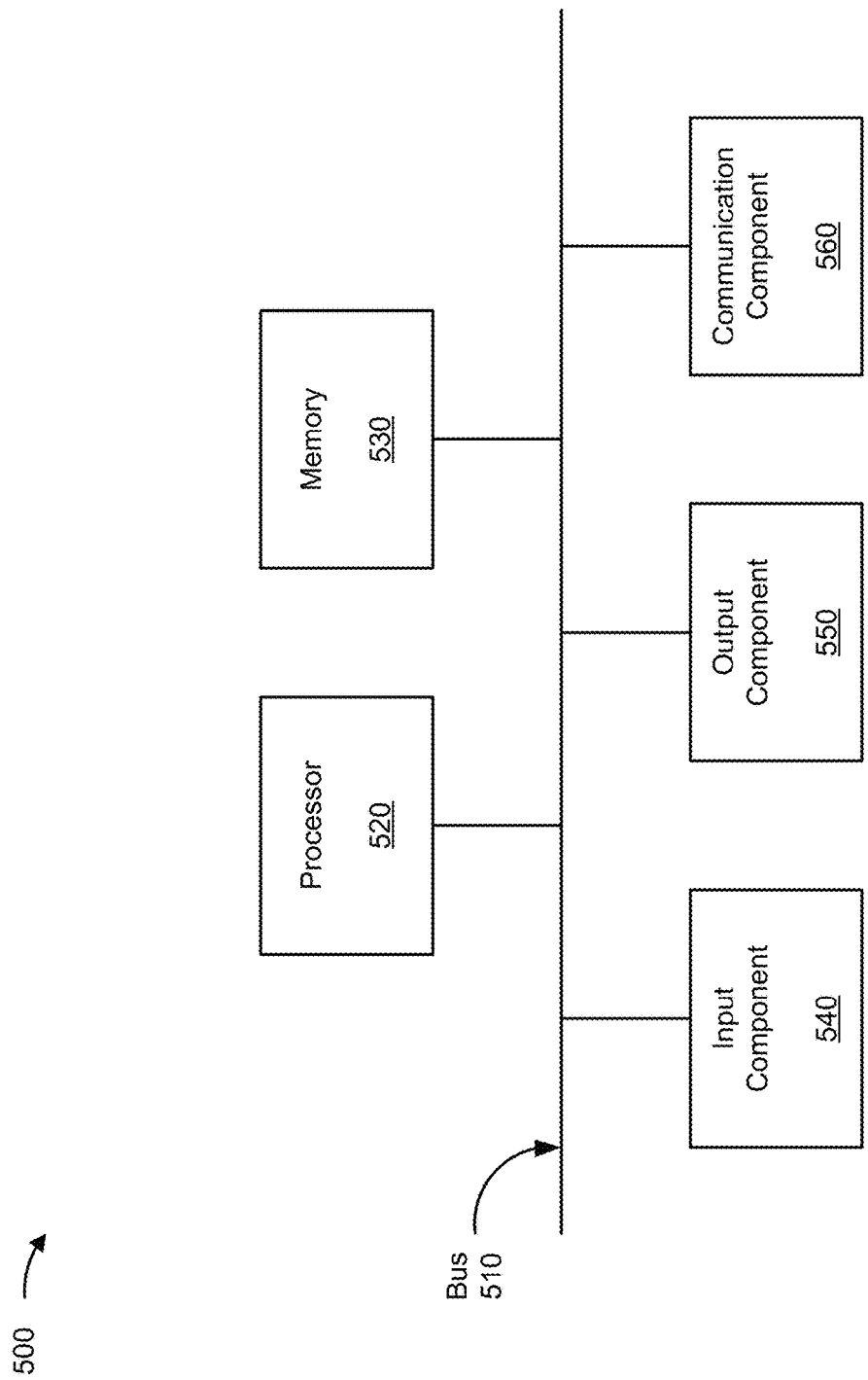
FIG. 5 is a diagram of example components of one or more devices of FIG. 4, in accordance with some embodiments of the present disclosure.

FIG. 5 is a diagram of example components of a device 500 associated with automating compliance activities for cloud-based applications using machine learning. The device 500 may correspond to a compliance server 430, a tracking system 440, a user device 450, and/or an organization repository 460. In some implementations, the compliance server 430, the tracking system 440, the user device 450, and/or the organization repository 460 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
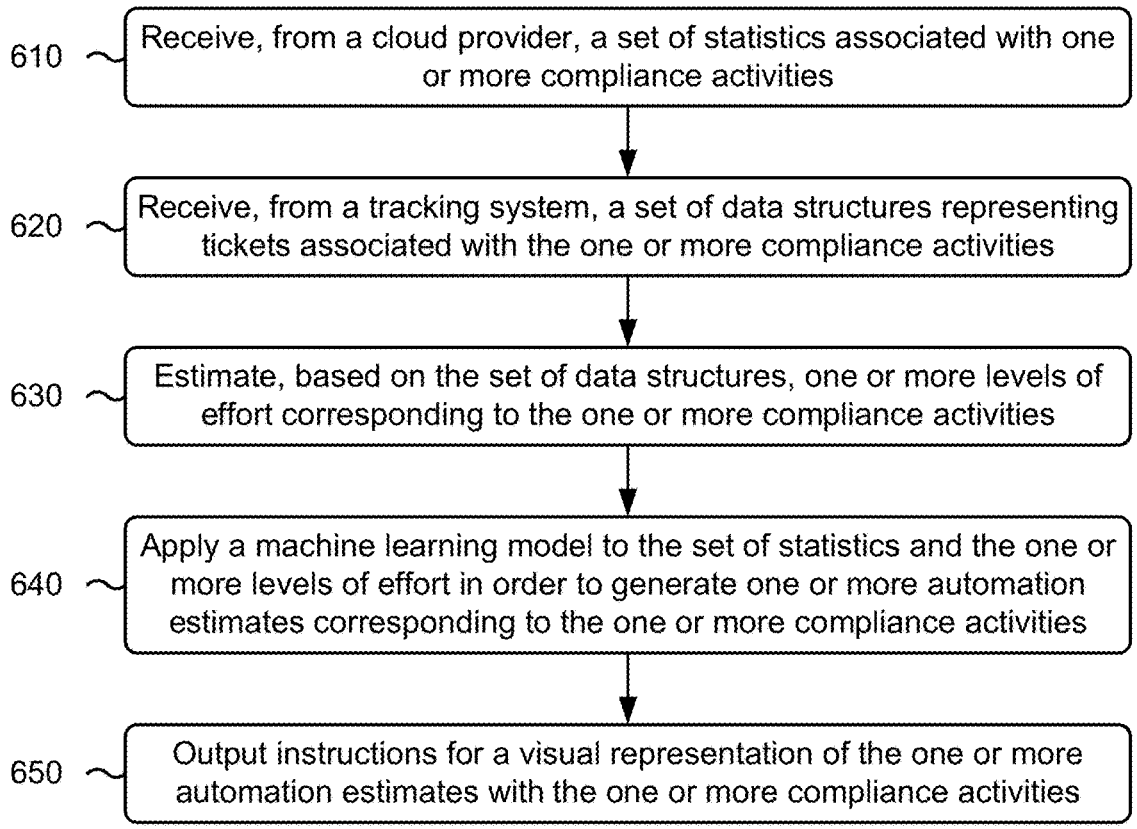
FIG. 6 is a flowchart of an example process relating to automating compliance activities for cloud-based applications using machine learning, in accordance with some embodiments of the present disclosure.

FIG. 6 is a flowchart of an example process 600 associated with automating compliance activities for cloud-based applications using machine learning. In some implementations, one or more process blocks of FIG. 6 may be performed by the compliance server 430. In some implementations, one or more process blocks of FIG. 6 may be performed by another device or a group of devices separate from or including the compliance server 430, such as a cloud provider 401, a tracking system 440, a user device 450, and/or an organization repository 460. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving, from a cloud provider, a set of statistics associated with one or more compliance activities (block 610). For example, the compliance server 430 (e.g., using processor 520, memory 530, input component 540, and/or communication component 560) may receive, from a cloud provider, a set of statistics associated with one or more compliance activities, as described above in connection with reference number 105 of FIG. 1A. As an example, the compliance server may transmit, and the cloud provider may receive, a request for the set of statistics. Accordingly, the cloud provider may transmit the set of statistics in response to the request. Additionally, or alternatively, the compliance server may subscribe to statistics updates from the cloud provider.

As further shown in FIG. 6, process 600 may include receiving, from a tracking system, a set of data structures representing tickets associated with the one or more compliance activities (block 620). For example, the compliance server 430 (e.g., using processor 520, memory 530, input component 540, and/or communication component 560) may receive, from a tracking system, a set of data structures representing tickets associated with the one or more compliance activities, as described above in connection with reference number 110 of FIG. 1A. As an example, the compliance server may transmit, and the tracking system may receive, a request for the set of data structures. Accordingly, the tracking system may transmit the set of data structures in response to the request. Additionally, or alternatively, the compliance server may subscribe to ticket updates from the tracking system.

As further shown in FIG. 6, process 600 may include estimating, based on the set of data structures, one or more levels of effort corresponding to the one or more compliance activities (block 630). For example, the compliance server 430 (e.g., using processor 520 and/or memory 530) may estimate, based on the set of data structures, one or more levels of effort corresponding to the one or more compliance activities, as described above in connection with reference number 120 of FIG. 1B. As an example, the compliance server may apply a model to determine the LoEs. For example, the compliance server may input the set of statistics and/or information extracted from the set of data structures to the model and receive indications of the LoEs from the model.

As further shown in FIG. 6, process 600 may include applying a machine learning model to the set of statistics and the one or more levels of effort in order to generate one or more automation estimates corresponding to the one or more compliance activities (block 640). For example, the compliance server 430 (e.g., using processor 520 and/or memory 530) may apply a machine learning model to the set of statistics and the one or more levels of effort in order to generate one or more automation estimates corresponding to the one or more compliance activities, as described above in connection with reference number 130 of FIG. 1C. As an example, the compliance server may input the set of statistics, the LoEs, one or more due dates associated with one or more compliance activities, information extracted from the set of data structures, and/or information associated with an organization responsible for the compliance activities to the machine learning model and receive indications of RoAs from the machine learning model.

As further shown in FIG. 6, process 600 may include outputting instructions for a visual representation of the one or more automation estimates with the one or more compliance activities (block 650). For example, the compliance server 430 (e.g., using processor 520, memory 530, and/or output component 550) may output instructions for a visual representation of the one or more automation estimates with the one or more compliance activities, as described above in connection with reference number 140 of FIG. 1D. As an example, the visual representation may include a tabular representation of the one or more automation estimates in association with the one or more compliance activities. In some implementations, the visual representation may additionally indicate a staffing estimate in association with the one or more compliance activities. Additionally, or alternatively, the visual representation may indicate one or more outcomes associated with failure of the one or more compliance activities. Additionally, or alternatively, the visual representation may include one or more links, to a communication platform, corresponding to the one or more compliance activities.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1G, 2, 3A, and/or 3B. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for deploying automation for compliance for cloud-based applications and computer systems, the system comprising:
one or more memories; and
one or more processors, communicatively coupled to the one or more memories, configured to:
receive, from a cloud provider, a set of statistics associated with one or more compliance activities;
receive, from a tracking system, a set of data structures representing tickets associated with the one or more compliance activities;
estimate, based on the set of data structures, one or more levels of effort corresponding to the one or more compliance activities;
apply a machine learning model to the set of statistics and the one or more levels of effort in order to generate one or more automation estimates corresponding to the one or more compliance activities; and
output instructions for a visual representation of the one or more automation estimates with the one or more compliance activities.

2. The system of claim 1, wherein the one or more processors, to receive the set of statistics, are configured to receive one or more of:
a datetime associated with a most recent certification of a team;
a datetime associated with a most recent rehydration for a cloud storage;
a completion status of an application profile review for a cloud application; or
a registration status for a dataset.

3. The system of claim 1, wherein the one or more processors are further configured to:
determine a set of compliance measurements associated with the one or more compliance activities; and
output instructions for a visual representation of the set of compliance measurements.

4. The system of claim 1, wherein the one or more processors are further configured to:
determine a set of ratios based on the set of data structures; and
output instructions for a visual representation of the set of ratios.

5. The system of claim 1, wherein the one or more processors are further configured to:
receive information associated with an organization responsible for the one or more compliance activities,
wherein the machine learning model is further applied to the information associated with the organization.

6. The system of claim 1, wherein the one or more processors are further configured to:
determine one or more due dates corresponding to the one or more compliance activities,
wherein the machine learning model is further applied to the one or more due dates.

7. The system of claim 1, wherein the one or more processors are further configured to:
generate a staffing estimate using the machine learning model,
wherein the visual representation further indicates the staffing estimate.

8. A method of deploying automation for compliance for cloud-based applications and computer systems, comprising:
receiving a set of data structures associated with one or more compliance activities;
applying a machine learning model to the set of data structures in order to generate one or more automation estimates corresponding to the one or more compliance activities;
outputting the one or more automation estimates to a user device;
receiving, from the user device, an indication of a selected compliance activity from the one or more compliance activities; and
generating an automation script for the selected compliance activity in response to the indication.

9. The method of claim 8, further comprising:
determining at least one compliance percentage associated with at least one application related to the one or more compliance activities; and
outputting instructions for a visual representation of the at least one compliance percentage.

10. The method of claim 8, further comprising:
determining at least one ratio based on a set of statuses corresponding to the set of data structures; and
outputting instructions for a visual representation of the at least one ratio.

11. The method of claim 8, wherein the one or more automation estimates include one or more amounts of time.

12. The method of claim 8, wherein the one or more automation estimates include one or more staffing levels.

13. The method of claim 8, wherein applying the machine learning model comprises:
clustering the set of data structures into a plurality of clusters; and
applying the machine learning model to each cluster of the plurality of clusters.

14. A non-transitory computer-readable medium storing a set of instructions for deploying automation for compliance for cloud-based applications and computer systems, the set of instructions comprising:
one or more instructions that, when executed by one or more processors of a device, cause the device to:
receive, from a cloud provider, a set of statistics associated with one or more compliance activities;
receive, from a tracking system, a set of data structures representing tickets associated with the one or more compliance activities;
perform clustering on the set of data structures to estimate one or more levels of effort corresponding to the one or more compliance activities;
apply a machine learning model to the set of statistics and the one or more levels of effort in order to generate one or more automation estimates corresponding to the one or more compliance activities; and
output the one or more automation estimates in association with the one or more compliance activities.

15. The non-transitory computer-readable medium of claim 14, wherein the one or more instructions, when executed by the one or more processors, further cause the device to:
determine one or more outcomes associated with failure of the one or more compliance activities,
wherein the one or more outcomes are additionally output in association with the one or more compliance activities.

16. The non-transitory computer-readable medium of claim 15, wherein the one or more outcomes are output using instructions for a visual representation using colors.

17. The non-transitory computer-readable medium of claim 14, wherein the one or more instructions, when executed by the one or more processors, further cause the device to:
   generate one or more links, to a communication platform, corresponding to the one or more compliance activities,
   wherein the one or more links are additionally output in association with the one or more compliance activities.

18. The non-transitory computer-readable medium of claim 14, wherein the one or more levels of effort include one or more amounts of time.

19. The non-transitory computer-readable medium of claim 14, wherein the one or more levels of effort are additionally output in association with the one or more compliance activities.

20. The non-transitory computer-readable medium of claim 14, wherein the one or more instructions, that cause the device to output the one or more automation estimates, cause the device to:
   output instructions for a tabular representation of the one or more automation estimates in association with the one or more compliance activities.

* * * * *